US005261132A

United States Patent [19]

Bufford et al.

[11] Patent Number: 5,261,132

[45] Date of Patent: Nov. 16, 1993

[54] PATIENT CHAIR CONSTRUCTION WITH RECLINER BACK TILT CONTROL AND FOOTREST HINGE CONSTRUCTION

[75] Inventors: Charles D. Bufford; James M. Gruidel, both of Hastings; Thomas G. Johnson, Blue Hill, all of Nebr.

[73] Assignee: Dutton-Lainson Company, Hastings, Nebr.

[21] Appl. No.: 764,540

[22] Filed: Sep. 24, 1991

[51] Int. Cl.$^{5}$ .......................... A61C 5/00; A47C 1/026

[52] U.S. Cl. ............................................ 5/613; 5/604; 5/620; 5/617; 297/354.13; 297/364; 297/423.3

[58] Field of Search .................... 5/604, 613, 617, 620, 5/624; 297/355, 363, 364, 433, 440

[56] References Cited

U.S. PATENT DOCUMENTS

| | | | |
|---|---|---|---|
| 657,360 | 9/1900 | Ritter | 297/364 X |
| 1,078,894 | 11/1913 | Ashby et al. | 5/617 |
| 1,282,274 | 10/1918 | Morozowicz et al. . | |
| 1,361,799 | 12/1920 | Adams | 297/364 |
| 1,846,548 | 2/1932 | Ganoung et al. . | |
| 1,905,425 | 4/1933 | Shaw | 297/363 |
| 2,673,987 | 4/1954 | Upshaw et al. . | |
| 2,681,455 | 6/1954 | Schwartz . | |
| 2,725,093 | 11/1955 | Saelen . | |
| 2,869,614 | 1/1959 | Wamsley | 5/604 X |
| 2,899,694 | 8/1959 | Horowitz . | |
| 3,220,575 | 11/1965 | Batty et al. . | |
| 3,380,085 | 4/1968 | Ferneau et al. . | |
| 3,732,584 | 5/1973 | James . | |
| 3,790,974 | 2/1974 | Johansson . | |
| 3,829,916 | 8/1974 | James . | |
| 3,866,250 | 2/1975 | Bradford . | |
| 3,936,893 | 2/1976 | Anderson et al. | 5/86.1 X |
| 3,940,808 | 3/1976 | Petrini . | |
| 3,966,632 | 12/1976 | Bakker nee Viel . | |
| 3,981,484 | 12/1976 | James . | |
| 4,193,147 | 3/1980 | Fischer . | |
| 4,232,412 | 11/1989 | Petrini . | |
| 4,255,823 | 3/1981 | Boyer et al. . | |
| 4,432,359 | 2/1984 | James . | |
| 4,484,366 | 11/1984 | Koontz . | |

*Primary Examiner*—Michael F. Trettel
*Attorney, Agent, or Firm*—Allegretti & Witcoff

[57] ABSTRACT

An improved patient chair includes a seat section, a pivotally attached back support and a removably attached leg support. A manually actuated camming mechanism permits adjustment of the back support between a prone position and a seated position. The leg support is detachable from the seat section to facilitate use of the patient chair construction as a chair.

5 Claims, 4 Drawing Sheets

Fig. 1 (PRIOR ART)
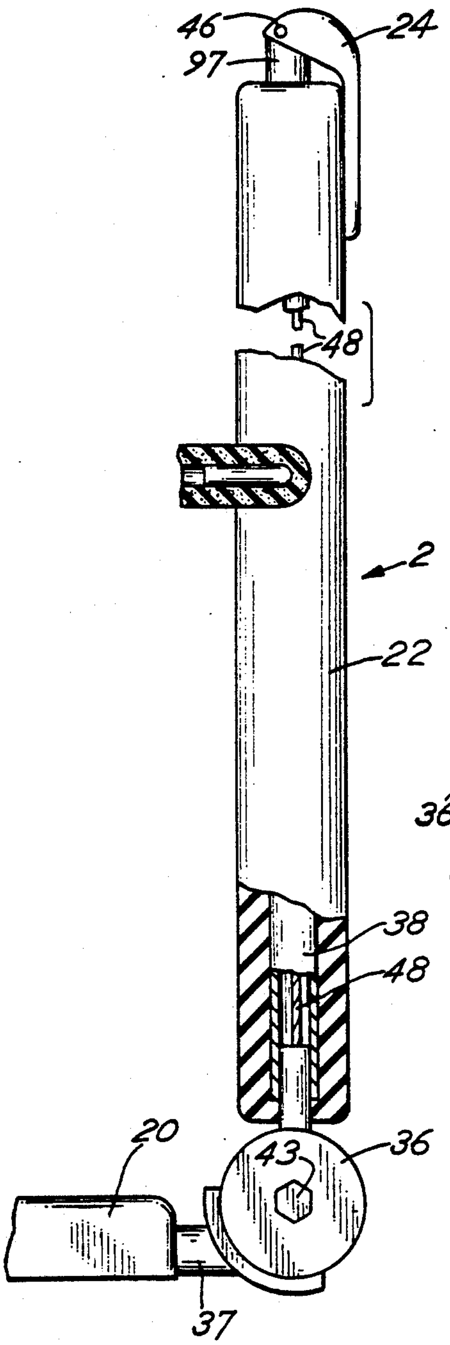
Fig. 2 (PRIOR ART)
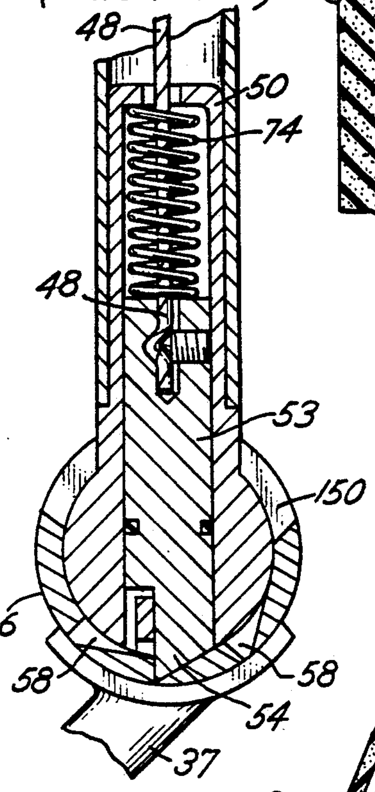
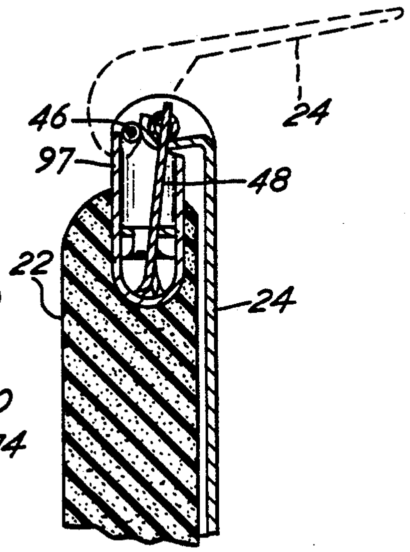
Fig. 3 (PRIOR ART)
Fig. 4 (PRIOR ART)
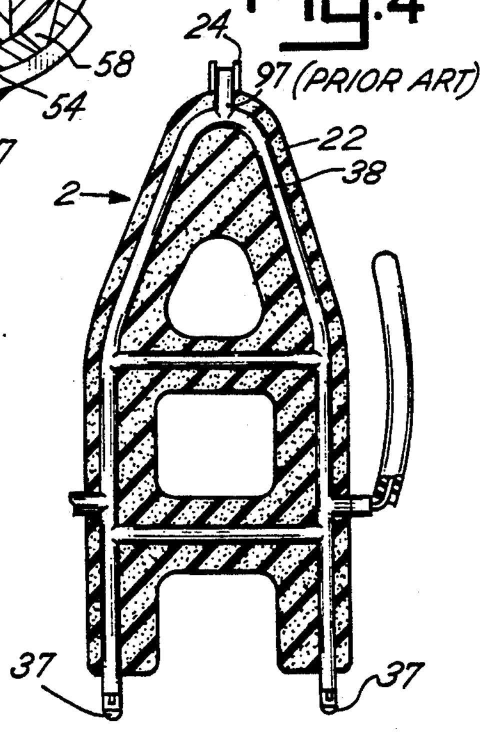

PATIENT CHAIR CONSTRUCTION WITH RECLINER BACK TILT CONTROL AND FOOTREST HINGE CONSTRUCTION

BACKGROUND OF THE INVENTION

In a principal aspect, this invention relates to an improved patient chair construction and, more particularly, to a patient chair construction of the type including a seat section, an adjustable back support, which may be adjusted for patient use in a prone position or in a seated position, and a removable peg support for patient use in a prone position.

Vanderheiden, in application Ser. No. 07/489,489, filed Mar. 13, 1990, now abandoned, discloses a hospital patient chair construction which includes a seat section and a pivotally attached back section that is adjustable between a prone position, a seated position, and at least one intermediate position. In that disclosure, a mechanism is disclosed for permitting adjustment of the pivotal angle of the back support section relative to the seat section. The mechanism includes hinges with spring biased plungers that engage a detent to lock the back support section in position. A cable mechanism is provided to release the spring biased plunger or cam from the detent when adjustment is desired.

While the mechanism is utilitarian, it is complex and reliability problems may arise due to cable elongation or breakage. The mechanism is also somewhat complicated. Thus, there has developed the need for an improved patient chair construction which includes a seat, an adjustable back support, and a leg support.

SUMMARY OF THE INVENTION

Briefly, the present invention comprises a patient chair construction which includes a seat section and a back support that is pivotally attached to the seat section by means of spaced hinges. A separate mechanism is integrated with the back support and seat section to permit adjustment of the pivotal angle of the back support relative to the seat section. The mechanism comprises a biased rod which extends the length of the back support and connects at one end to a plunger which may engage a detent in the seat section and at the other end with a handle. The rod is generally biased toward the engaged position. The handle is manually actuable to release the plunger from the detent. An additional optional feature of the invention is a leg support which is also attachable to the seat section for support of a prone patient. The leg support includes a special combination of pins and studs that cooperatively engage with spaced bracket members of the seat section and, more particularly, with appropriately designed passages or holes associated with spaced bracket members attached to the seat section.

Thus, it is an object of the invention to provide an improved patient chair construction with an adjustable back support that can be easily assembled, is of reliable construction, and which is easily adjustable.

Yet, a further object of the invention is to provide an improved patient chair construction of the type which includes seat section with a pivotable back support affixed thereto and which also includes an adjustable and removable leg support that may be attached to the seat section to facilitate maintaining a patient in a prone position.

Yet, a further object of the invention is to provide an improved means for interconnecting a leg support with a seat section in a patient chair construction.

Another object of the invention is to provide a simplified mechanism for holding a back support relative to a seat section separate and apart from the hinges connecting the back support to a seat section.

These and other objects, advantages, and features of the invention will be set forth in the detailed description which follows.

BRIEF DESCRIPTION OF THE DRAWING

In the detailed description, reference will be made to the following FIGURES:

FIG. 1 is a side elevation of a prior art construction;

FIG. 2 is an enlarged detail of the hinge element associated with the prior art construction of FIG. 1;

FIG. 3 is an enlarged cross-sectional view of the actuating mechanism associated with the detent mechanism of the prior art construction of FIG. 1;

FIG. 4 is a plan cross-sectional view of the prior art back support construction of FIG. 1;

DESCRIPTION OF THE PREFERRED EMBODIMENT

Figure 5:
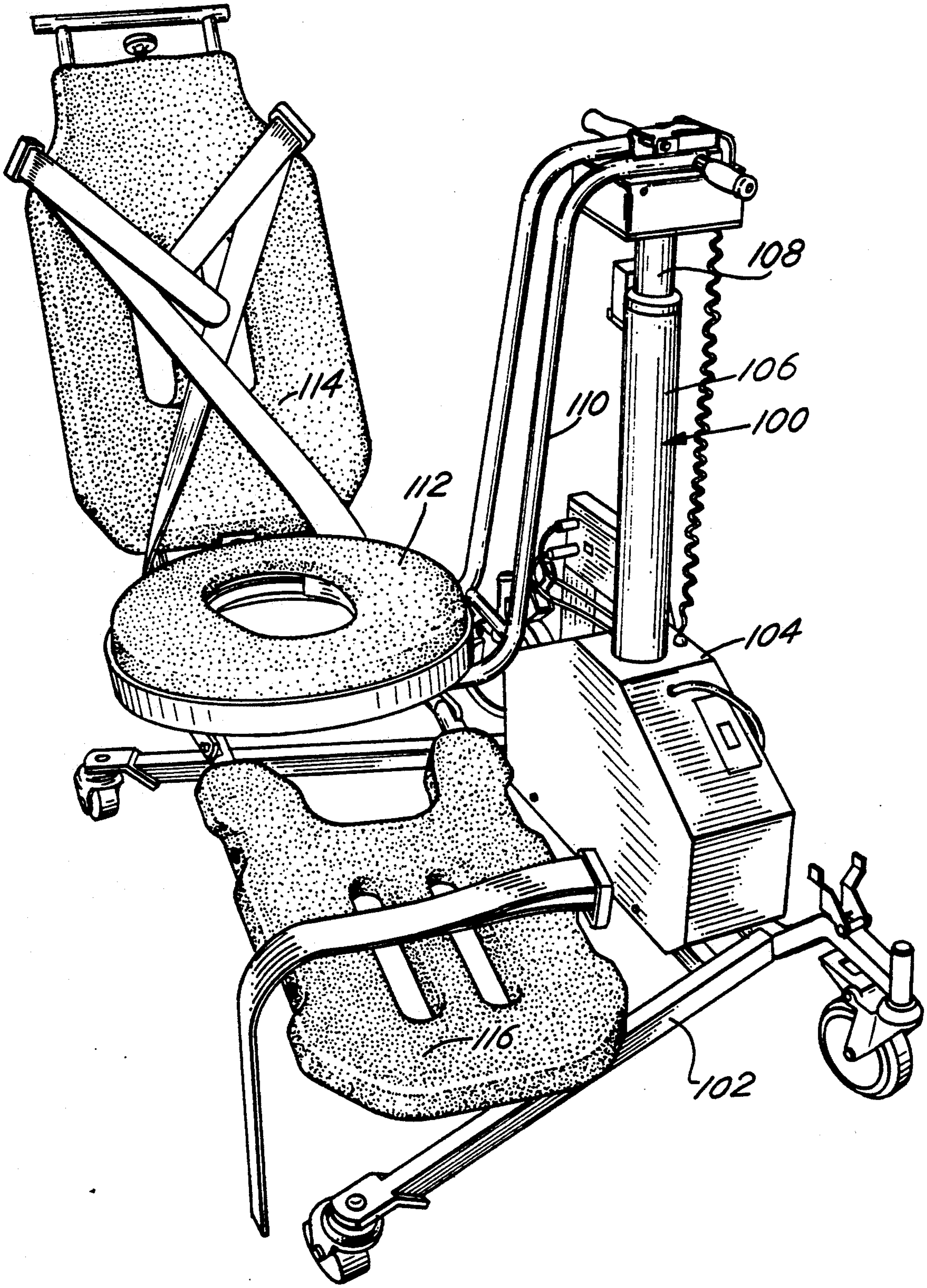
FIG. 5 is a perspective view depicting the improvement of the present invention in a patient chair construction comprised of a seat section, a back support, and a leg support.

FIGS. 1 through 4 illustrate a prior art patient chair construction and, more particularly, a patient chair construction which provides a mechanism for adjustment of the pivotal relationship between a back support 2 and a seat section 20. Thus, the prior art back support 2 is attached via hinges 36 to brackets 37 projecting from the seat section 20. A connecting hinge pin 43 serves as a pivot axis and connecting means for connecting each hinge 36 with each bracket 37. The hinge 36 and the bracket 37 include an internal construction as depicted in FIG. 2 which enables locking engagement of the back support 2 relative to the seat section 20.

Specifically referring the FIG. 2, a plunger 53 is biased by a spring 74 into engagement with a detent 58 associated with the bracket 37. A multiplicity of detents 58 are provided so that the plunger 53 and, more particularly, the forward camming point 54 may engage a desired detent 58. A cable 48 is attached to the plunger 53 and is responsive to movement of a handle 24. A pivot pin 46 pivotally connects the handle 24 with a back support tubular member 97. Pivotable action of the handle 24 will cause the cable 48 to pull against the biasing force of the spring 74, thereby releasing the plunger 53 from engagement with a detent 58. This permits pivotable movement of the back support 22 about the hinge pins 43. Reverse movement of the handle 24 permits re-engagement of the plunger 53 with an appropriate detent 58. Cable 48 extends through hollow tubular members 38 defining a back support frame as shown in FIG. 4.

The prior art construction is useful, but if the cable 48 requires replacement, repair or adjustment may be quite difficult. Additionally, the detent mechanism incorporated in each of the hinges renders manufacture of the product expensive and complex.

The remaining FIGS. 5 through 9 illustrate the improvement of the present invention associated with a basic support. Also provided is a leg support mechanism of simplified construction. Referring therefore to FIG. 5, there is depicted, in general, a patient transport carriage 100 that is comprised of a wheeled frame 102 supporting a lift mechanism 104 including a lift tube assembly 106. A telescoping support rod 108 associated with the lift mechanism 104 supports a patient chair bracket or frame 110. The bracket or frame 11O is associated with and attached to a seat section 112 of a patient chair construction. A back support 114 is attached by means of hinges to the seat section 112, and a leg support 116 is also attachable to the seat section 112. The subject matter of the present invention relates particularly to the mechanism for adjustment of the back support 114 relative to the seat section 112, as well as the mechanism for attachment of the leg support 116 to the seat section 112.

The leg support 116 is attached to the seat section 112 generally only when a patient is being transported in a substantially prone position. Otherwise, the leg support 116 is removed from the seat section 112 so that the patient may sit on the seat section 112 with legs extending downwardly in a seated position. The back support 1 14, however, is adjustable between a prone position which is substantially horizontal to a semi-prone position such as depicted in FIG. 5 to a totally upright position wherein the back support 114 is substantially at right angles relative to the plane of the seat section 112. Typically, then the leg support 116 and back support 114 are assembled with the seat section 112 whenever the patient is in the prone position or a nearly prone position. However, when the patient is in a upright, seated position, the leg support 116 is removed and the back support 114 forms a substantially right angle with the seat section 112.

Back Support Construction

Figure 6:
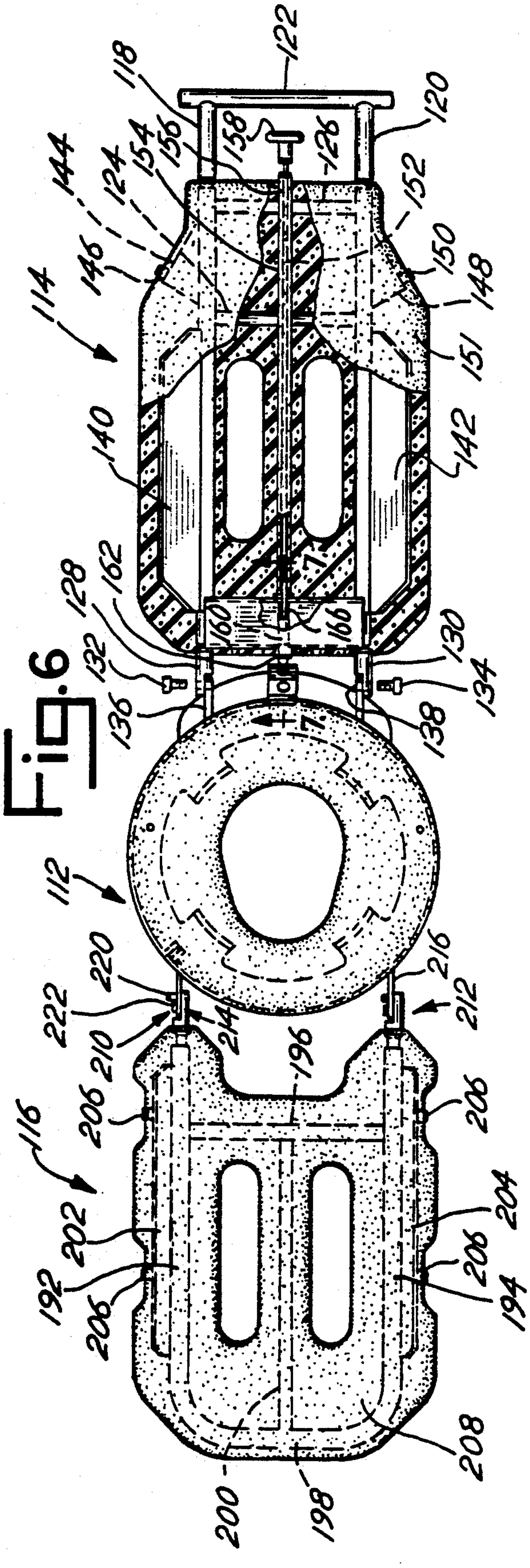
FIG. 6 is a plan view of the improved patient chair construction depicted in FIG. 5.

FIG. 6 illustrates, in a top plan view, the assembly of the seat section 112, back support 114, and leg support 116. Referring specifically, however, to the construction of the back support 114 and seat section 112, it will be noted that the back support 114 is comprised of a tubular frame including first and second parallel side tubes 118 and 120. The side tubes 118 and 120 are spaced from one another and are connected by a series of cross members 122, 124 and 126 to thereby define a frame. A hinge member 128 is attached at the inner end of the side tube 118. A hinge member 130 is also attached to the inner end of the side tube 120. Hinge members 128 and 130 are pivotally attached by means of hinge pins 132 and 134, respectively, to parallel spaced hinge plates 136 and 138, respectively, extending from the seat section 112. In this manner, the back support frame is pivotally moveable about a pivot axis defined by the pins 132 and 134.

The frame also includes recliner side braces 140 and 142 welded to the side tubes 118 and 120 respectively. A second side brace 144, with a projecting patient strap retaining stud 146, is attached to the side tube 118. A second side brace 148, with a similar pin 150, is attached to the other side tube 120.

The frame is surrounded and encased within a padded foam material 151 for patient comfort. A hollow tube 154 is incorporated in the frame and extends along the center line axis 152 of the frame defined by the side tubes 118 and 120 and cross members 122, 124, 126. A slidable rod 156 is positioned within the tube 154. A manually operable handle 158 is attached to the outer end of the rod 156. The opposite end of the rod 156, which is slidable within the tube 154 in the direction of the axis 152 or axially, is connected to a plunger 160 which projects through an annular ring 162 welded to the cross piece 122. The plunger 160 includes an active projecting end 164 which projects from the ring 162.

A spring, namely a spiral spring 166, surrounds the rod 154 and is retained within the tube 152. The spring 166 is compressed between a stop 168 and the plunger 160. The spring 166, thus biases the plunger 160 axially toward the seat section 112 and toward the axis of rotation defined by the pins 132 and 134. Note that the plunger 160 includes a land or stop which limits the extent of biased travel of the plunger 160 into the ring 162 and projecting from the ring 162.

Figure 7:
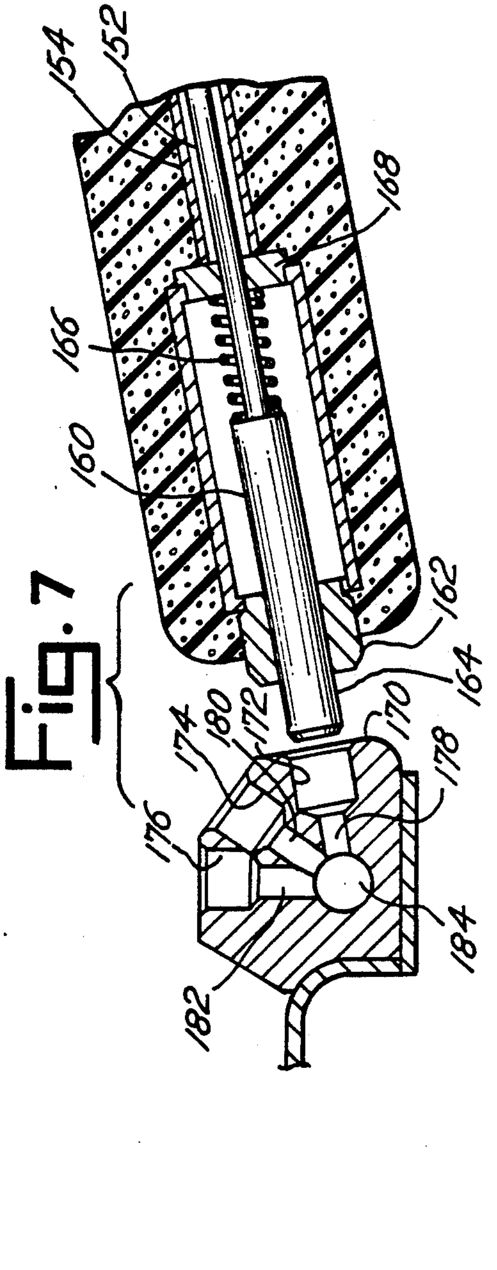
FIG. 7 is a cross-sectional view of the cam block which includes the detents for maintaining the position of the back support, said cam block being incorporated with the seat section.

The plunger 160 cooperates with a pin stops or detents associated with a cam block 170 as depicted in FIG. 7. The cam block 170 includes a first counterbore 172, a second counterbore 174 and a third counterbore 176 which extend radially from an axis defined by the pins 132 and 134. When the plunger 160, and, more particularly, the active end 164, engages the counterbore 172, the back support 114 is locked in a generally horizontal position or straight position relative to the seat section 112. Movement of the plunger 160 against the biasing force of spring 166 to thereby release plunger 160 from the counterbore 172 permits pivotable motion of the back support 114 so that it may be moved into one of the other counterbores 174, for example, which is a semi-prone position or 176, which is a seating position of the back support 114 relative to the seat section 112. Note that each counterbores 172, 174 and 176 includes a companion drain passages 178, 180 and 182 which connect the associated counterbore 172, 174 and 176 with a transverse passage 184 through the block 170. The transverse passage 184 thus serves as an outlet for any fluid which might be retained in the mechanism during its usage.

In operation, pulling on the handle 158 will permit adjustment of the back support 114 relative to the seat section 112. A patient which is supported by the patient chair construction may thus be in a seated position, for example, wherein the plunger 160 is in the counterbore 176. The patient in that seated position may be emersed or placed in a bathing tub by means of the mechanism as shown in FIG. 5. Note that any fluid within the tub will not be retained within the locking detent construction because of the passages, such as passage 182 and transverse passage 184. The construction eliminates problems with a cable that may fracture or stretch with usage. The construction of the present invention also eliminates the need for having a complex assembly associated with each hinge in order to maintain the back support 114 in a fixed position relative to seat section 112.

Leg Support Construction

Figure 8:
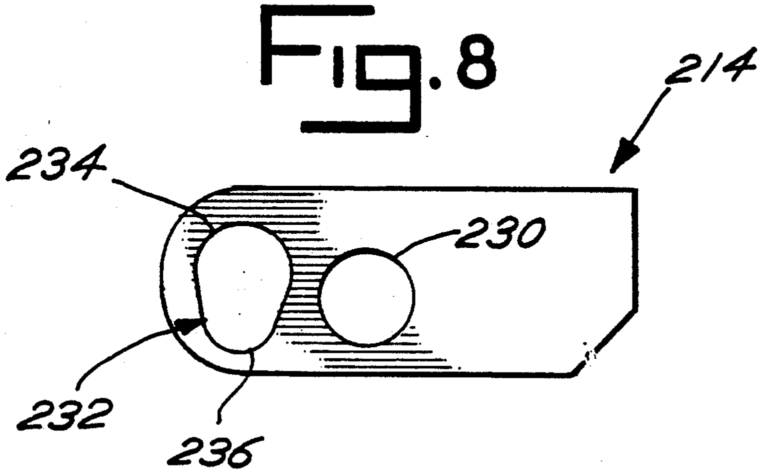
FIG. 8 is a side elevation view of the seat section support bracket for leg support.
Figure 9:
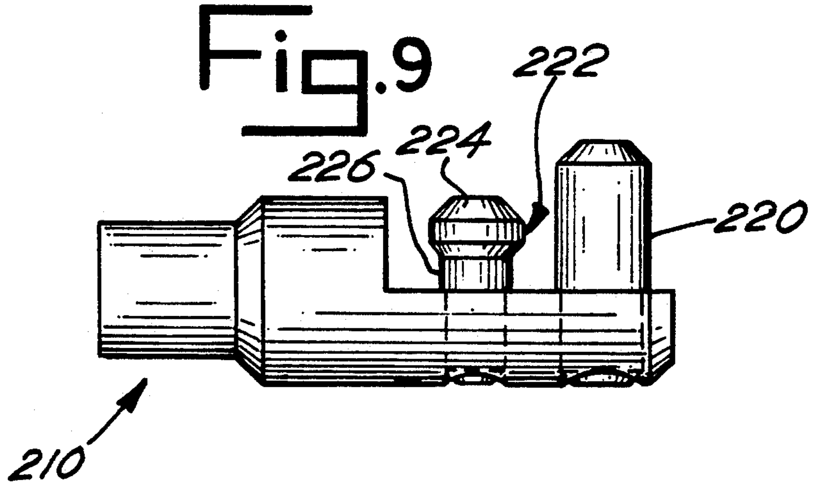
FIG. 9 is a top plan view of hinge plate assembly associated with the leg support which is cooperative with the bracket depicted in FIG. 8.

Referring again to FIG. 6 as well as to FIGS. 8 and 9, there is depicted a leg support 116. The leg support 116 is formed from a closed tubular member which is formed in a U-shape. Thus, a closed tubular loop is comprised of side loop sections 192 and 194 interconnected by means of a cross brace 196. The sides 192 and 194 are connected by the crown 198. A middle tubular brace 200 may optionally be included. Wing plates 202 and 204 are attached respectively to the sides 192 and 194. The plates 202 and 204 include projecting studs, such as studs 206, which cooperate with patient restraint belts that are attached to the studs during operational use of the chair construction. The leg support 116, except for the hinge construction to be described below is generally covered or encased in a protective material, such as a molded foam material 208. The molded foam 208 thus has a desired pattern which encases the skeleton defined by the described frame.

Side 192 terminates with a specially constructed hinge plate assembly 210. In a similar fashion side 194 terminates with a specially constructed hinge plate assembly 212. The hinge plate assembly 210 cooperates with a hinge bracket 214 attached to the seat section 112. The hinge plate assembly 212 cooperates with the hinge bracket 216 which is also projecting from and attached to the seat section 112. FIG. 8 illustrates in a side view the construction of the hinge bracket 214. FIG. 9 illustrates in a top plan view the construction of the hinge plate assembly 212. Note very importantly that the brackets 214 and 216 are spaced laterally from one another substantially equally to the spacing between the hinge plate assemblies 210 and 212.

Each hinge plate assembly 210 and 212 is of substantially identical construction as are the hinge brackets 214 and 216. Thus the following description with respect to bracket assembly 210 and plate 214 apply to the bracket assembly 212 and plate 216.

The hinge plate assembly 210 includes a first outwardly extending positioning pin 220, which is generally cylindrical and projects transversely from the bracket 216. A headed stud 222 is positioned inwardly of the pin 220. The headed stud 222 includes an enlarged outer head 224 and a reduced cross-section, dimension neck 226. Note that the stud 222 projects a lesser distance from the hinge plate assembly than the pin 220. The pin 220 is generally cylindrical in shape. The configuration of the stud 222 is that of a series of connected cylindrical shapes so that the cross-section of stud 222 is circular at any given section. The bracket 214 with which the pin 220 and stud 222 cooperate projects horizontally from the seat section 112 so that the leg support 116 will be generally horizontal and in the plane of the section 112 for support of a patient in a generally prone position.

The bracket 214 includes a first or inner passage 230 having a circular cross-section for receipt of the pin 220. A second teardrop shaped passage 232, as shown in FIG. 8 includes a larger diameter end 234 and a narrow necked end 236. The teardrop opening 232 is thus sized so that the head of the stud 222 will fit through the opening 234. The neck 226 of the stud 222 has a dimension which is sized so that after the head 224 fits through the opening 234, the neck 226 can slide downwardly into the slot at the narrow end 236 of the teardrop passage. In this manner, the leg support 116 is firmly locked into position in combination with the brackets 214 and 216 after the pin 220 serves to guide the leg support 116 properly into engagement with the seat section 112. Thus, the sizing of the head 224 and neck 226 of the stud 222 as well as the thickness of the plate 214 all combine to provide for an improved means for attaching the leg support 116 in a fail safe manner to the seat section 112 in order to provide a patient support construction which is derived from or created from the same system that can be used to support the patient in the seated position.

It is possible to vary the construction and various details of the subject matter of the preferred embodiment. The invention is, therefore, to be limited by the following claims and their equivalents.

What is claimed is:

1. In a patient chair construction of the type including a seat section with a back support attached thereto by spaced hinges, said back support including a longitudinal center line, a lower hinge edge and a top edge, the improvement comprising in combination:

(a) a back support tilt control including:

a center support tube extending longitudinally generally along the center line of the back support from the hinge edge of the back support toward the top edge;

a cam with multiple detents, said cam affixed to the seat section in opposed relation to the tube;

a slidable rod in the tube with a handle toward the top edge and a shaped plunger at the hinge edge;

biasing means for biasing the plunger toward the hinge edge and into engagement with a detent of the cam whereby, the handle may be manipulated to release the plunger from a detent of the cam so that the back support may be pivoted and oriented in a desired position relative to the seat section, and then the handle may be released to lock the plunger into a detent to thereby retain the back support in the desired orientation; and (b) a removable leg support section attachable to the seat section including:

first and second spaced leg section support brackets extending generally parallel to one another from the seat section, each bracket including a first inner-circular cross-section passage and a second outer teardrop cross-section passage, said passages for each bracket being generally aligned to define an axis transverse to the brackets;

a leg support section having first and second parallel hinge plates spaced substantially the same distance as the support brackets, each plate including a pin and a headed stud extending transversely therefrom, said pins positioned for axial movement and engagement with the inner passages, said stud aligned for simultaneous axial movement and engagement with the teardrop-shaped cross-section passage, each stud having an enlarged head to fit into one enlarged end of a teardrop-shaped cross-section passage, and each stud including a neck for retaining the stud in a locking position by sliding engagement into the narrow end of the teardrop-shaped cross-section passage, said first and second passages being in substantially the same horizontal plane to define two points of support for the leg support for each engaged leg section support bracket and hinge plate.

2. The improvement of claim 1 wherein the pin and stud affixed to each hinge plate extend in the same direction from each plate whereby the leg support is attached to the seat section by axial sliding of the pins and studs into the passages.

3. The improvement of claim 1 wherein the pin extends from its plate a greater distance than the adjacent stud.

4. The patient chair construction of claim 1 including a drain hole extending from the surface of the detent cam through the cam and through a surface of the cam which does not engage the plunger and which thereby serves as a release for fluid which may collect in a detent.

5. In a patient chair construction of the type including a seat section with a back support attached thereto by spaced hinges, said back support including a longitudinal center line, a lower hinge edge and a top edge, the improvement of a back support tilt control comprising in combination:

a center support tube extending longitudinally generally along the center line of the back support from the hinge edge of the back support to the top edge;

a cam with multiple detents, said cam affixed to the seat section in opposed relation to the tube;

a slidable rod in the tube with a handle at the top edge and a shaped plunger at the hinge edge;

biasing means for biasing the plunger toward the hinge edge and into engagement with a detent of the cam whereby, the handle may be manipulated to release the plunger from a detent of the cam so that the back support may be pivoted and oriented in a desired position relative to the seat section, and then the handle may be released to lock the plunger into a detent to thereby retain the back support in the desired orientation; and including a drain hole extending from the surface of the detent cam through the cam and through a surface of the cam which does not engage the plunger and which thereby serves as a release for fluid which may collect in a detent.

* * * * *